(12) United States Patent
Wang

(10) Patent No.: US 11,306,759 B2
(45) Date of Patent: Apr. 19, 2022

(54) FASTENER STRUCTURE AND ASSEMBLING METHOD THEREOF

(71) Applicant: FIVETECH TECHNOLOGY INC., New Taipei (TW)

(72) Inventor: Ting-Jui Wang, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 13 days.

(21) Appl. No.: 16/944,189

(22) Filed: Jul. 31, 2020

(65) Prior Publication Data
US 2021/0048054 A1    Feb. 18, 2021

(30) Foreign Application Priority Data
Aug. 16, 2019   (TW) ................. 108129326

(51) Int. Cl.
*F16B 19/04* (2006.01)
*B21J 15/02* (2006.01)

(52) U.S. Cl.
CPC .............. *F16B 19/04* (2013.01); *B21J 15/02* (2013.01)

(58) Field of Classification Search
CPC ......... F16B 5/208; F16B 5/0621; B21J 15/02; B21J 15/04; B21J 15/046
See application file for complete search history.

(56) References Cited

U.S. PATENT DOCUMENTS

2009/0060680 A1*   3/2009   Chen .................... F16B 5/0208
411/508

FOREIGN PATENT DOCUMENTS

TW         M537021 U       2/2017

* cited by examiner

*Primary Examiner* — Jason L Vaughan
*Assistant Examiner* — Amanda Kreiling

(57) ABSTRACT

A fastener structure and an assembling method thereof are introduced. The fastener structure includes a head portion and a body portion. The body portion is movably connected to the head portion and includes a connecting section for assembling to an intermediate member. The intermediate member includes a material retaining section and can be further connected to an object. Partial material of the object would move or flow into the material retaining section when the intermediate member is forcefully pressed against the object, so that the intermediate member and the object are connected together. Since the body portion can be assembled to the intermediate member and the intermediate member can be further connected to an object, and the fastener structure can be fastened to and released from a target object, at least two objects can be repeatedly and quickly connected to and disconnect from one another using the fastener structure.

15 Claims, 5 Drawing Sheets

111

(a)　　(b)　　(c)　　(d)

FASTENER STRUCTURE AND ASSEMBLING METHOD THEREOF

CROSS-REFERENCE TO RELATED APPLICATION

This non-provisional application claims priority under 35 U.S.C. § 119(a) on Patent Application No(s). 108129326 filed in Taiwan, R.O.C. on Aug. 16, 2019, the entire contents of which are hereby incorporated by reference.

BACKGROUND OF THE INVENTION

1. Field of the Invention

The present disclosure relates to a fastener structure and an assembling method thereof, and in particular to a fastener structure and an assembling method thereof that enable repeatable and quick connection and disconnection of at least two objects to and from one another.

2. Description of the Related Art

In the case at least one object is to be connected to another object, screws are usually used to directly lock the two objects together.

However, while the aforesaid method is very often used to enable fixed and non-easily-separable connection of at least one object to another object, the two objects so connected might still become unstably movable relative to each other.

It is therefore tried by the inventor to develop a fastener structure and an assembling method thereof in an attempt to enable repeatable and quick connection and disconnection of at least two objects to and from one another.

BRIEF SUMMARY OF THE INVENTION

An objective of the present disclosure is to overcome the disadvantages in the conventional fastening method by providing a fastener structure and an assembling method thereof to enable repeatable and quick connection and disconnection of at least two objects to and from one another.

To achieve at least the above objective, the fastener structure provided according to an embodiment of the present disclosure includes a head portion and a body portion. The body portion is movably connected to the head portion and includes a connecting section for assembling to an intermediate member. The intermediate member includes a material retaining section and can be further connected to an object. Part of the material of the object is caused to move or flow into the material retaining section when the intermediate member is forcefully pressed against the object, so that the intermediate member and the object are connected together.

The fastener structure provided according to another embodiment of the present disclosure includes a head portion and a body portion. The body portion is movably connected to the head portion and includes a connecting section for assembling to an intermediate member. The intermediate member includes a retaining section and can be further connected to an object. The retaining section is connected to the object through expansion connection when the retaining section is deformed under an external force applied thereto.

In the fastener structure provided according to any one of the above embodiments, the connecting section is assembled to the intermediate member through expansion connection when an external force is applied to the connecting section.

In the fastener structure provided according to any one of the above embodiments, the head portion includes a mating stop section and the body portion includes a stop section. The mating stop section and the stop section are pressed against each other when the head portion and the body portion are movably connected together, so that the head portion and the body portion do separate from each other.

In the fastener structure provided according to any one of the above embodiments, the head portion includes a fastening section.

In the fastener structure provided according to any one of the above embodiments, the fastening section can be a cylinder, a screw, a male fastener or a female fastener.

The fastener structure provided according to any one of the above embodiments further includes an elastic element, which has an end pressed against the head portion and another end pressed against the body portion.

In the fastener structure according to the above embodiments, the head portion has a width larger than that of the body portion, the intermediate member has a width larger than that of the head portion, and the object includes an assembling hole dimensionally larger than the head portion but smaller than the intermediate member.

In the fastener structure according to the above embodiments, the intermediate member and the object are respectively made of a metal material; and the intermediate member has a hardness that can be higher or lower than that of the object.

In the fastener structure according to the above embodiments, the body portion includes a shoulder section; and the intermediate member is clamped between the connecting section and the shoulder section.

In the fastener structure according to the above embodiments, the connecting section has a material filling recess. When the connecting section is pressed against the intermediate member, partial material of the intermediate member is caused to move or flow into the material filling recess, which makes the body portion to be connected to the intermediate member.

To achieve at least the above objective, the fastener structure assembling method provided according to an embodiment of the present disclosure includes the following steps: assembling a connecting section of the fastener structure to an intermediate member; and connecting a material retaining section of the intermediate member to an object by pressing the intermediate member against the object, so that partial material of the object is forced to move or flow into the material retaining section, which makes the intermediate member to be connected to the object.

The fastener structure assembling method provided according to another embodiment of the present disclosure includes the following steps: assembling a connecting section of the fastener structure to an intermediate member; and connecting a retaining section of the intermediate member to an object by applying an external force on the retaining section, so that the retaining section is deformed and connected to the object through expansion connection.

With the fastener structure and the assembling method thereof according to the present disclosure, when the body portion is assembled to the intermediate member and the intermediate member is then connected to the object, the fastener structure can be connected to and released from a target object. Therefore, at least two objects can be repeatedly and quickly connected to and disconnect from one another using the fastener structure.

DETAILED DESCRIPTION OF THE INVENTION

To facilitate understanding of the objectives, characteristics and effects of this present disclosure, embodiments together with the attached drawings for the detailed description of the present disclosure are provided.

Figure 1:
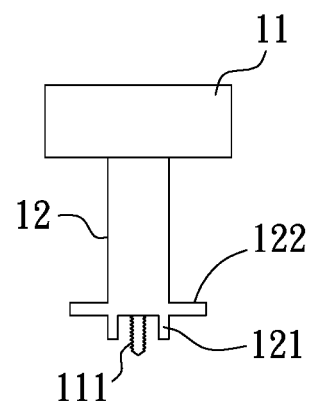
FIG. 1 is a side view of a fastener structure according to a first embodiment of the present disclosure.
Figure 2:
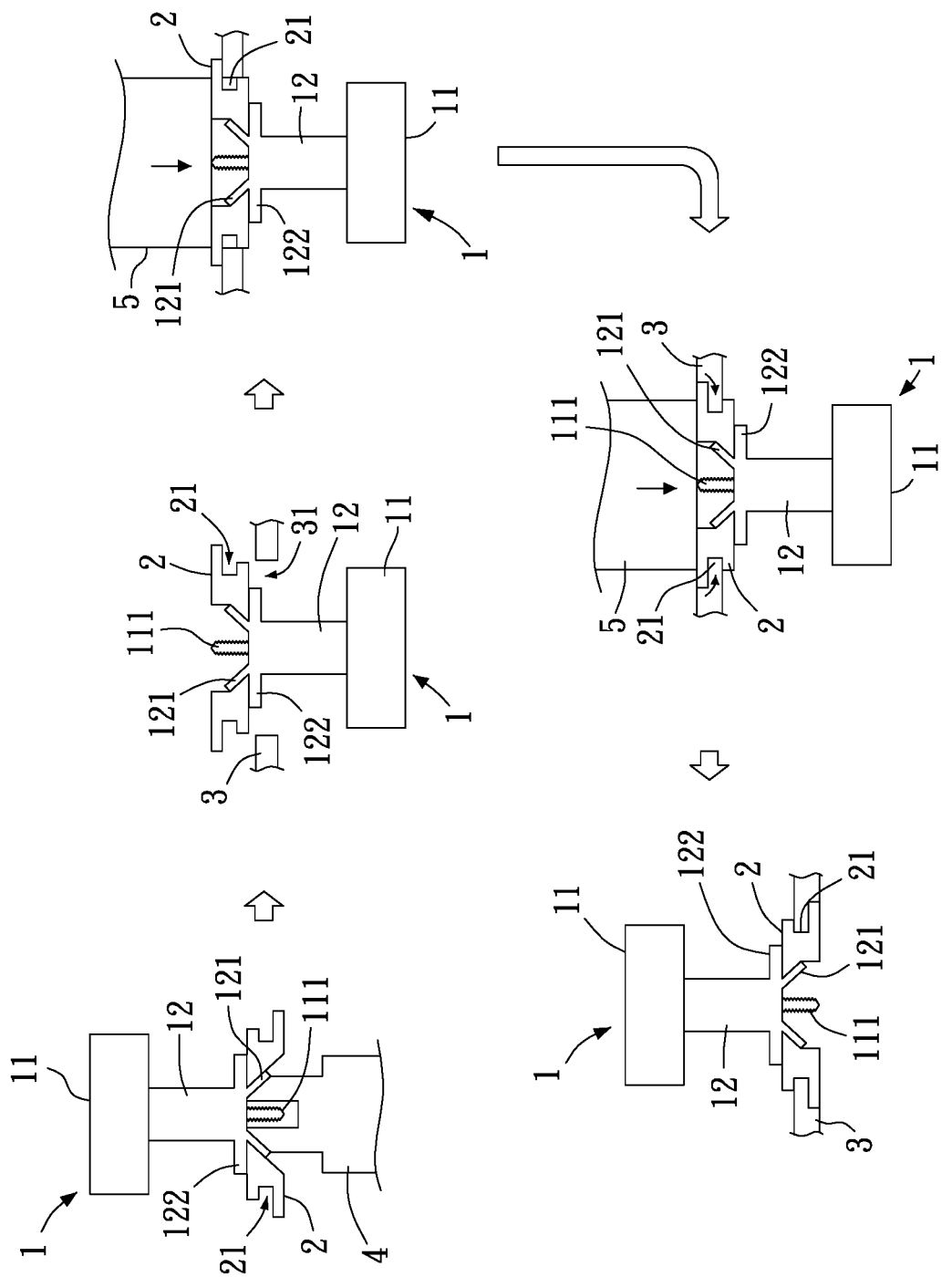
FIG. 2 pictorially illustrates an assembling method of the fastener structure of FIG. 1.

Please refer to FIG. 1, which is a side view of a fastener structure 1 according to a first embodiment of the present disclosure; and to FIG. 2, which is a pictorial description of an assembling method of the fastener structure 1 according to the present disclosure. As shown, in the first embodiment, the fastener structure 1 includes a head portion 11 and a body portion 12.

The body portion 12 is movably connected to the head portion 11 and includes a connecting section 121 for assembling to an intermediate member 2. The intermediate member 2, after having been assembled to the body portion 12, can be further connected to an object 3. The intermediate member 2 includes a material retaining section 21. The intermediate member 2 can be forcefully pressed against the object 3, so that partial material of the object 3 is caused to move or flow into the material retaining section 21, bringing the object 3 to be connected to the intermediate member 2.

To assemble the fastener structure 1, first place the body portion 12 thereof on the intermediate member 2. Then, use a die 4 to press against the connecting section 121 of the body portion 12, so that the connecting section 121 under the externally applied force is deformed and connected to the intermediate member 2 through expansion connection. As a result, the fastener structure 1 is preliminarily assembled to the intermediate member 2. Thereafter, place the intermediate member 2 on the object 3, and use another die 5 to press against the intermediate member 2, such that the intermediate member 2 is pressed against the object 3, causing partial material of the object 3 to move or flow into the material retaining section 21. As a result, the intermediate member 2 is connected to the object 3. In the above-described manner, the body portion 12 of the fastener structure 1 can be assembled to the intermediate member 2 and the latter can be then further connected to the object 3, while the fastener structure 1 can be fastened to a target object (not shown) or released from the target object. Thus, at least two objects can be repeatedly and quickly connected to and disconnected from one another.

Figure 3:
FIG. 3 shows some different configurations available for a fastening section of the fastener structure of FIG. 1.
Figure 3:
Figure 3:
Figure 3:

In the illustrated first embodiment of the present disclosure, the head portion 11 includes a fastening section 111, which can be in the form of a cylinder as shown in FIG. 3(a), a screw as shown in FIG. 3(b), a male fastener as shown in FIG. 3(c), or a female fastener a shown in FIG. 3(d). Thus, after the body portion 12 has been assembled to the intermediate member 2 and the intermediate member 2 has also been connected to the object 3, the fastening section 111 of the fastener structure 1 can be fastened to or released from the target object. In this way, at least two objects can be repeatedly and quickly connected to and disconnected from one another.

In the illustrated first embodiment of the present disclosure, the body portion 12 further includes a shoulder section 122; and the intermediate member 2 is clamped between the connecting section 121 and the shoulder section 122, such that the body portion 12 of the fastener structure 1 is firmly assembled to the intermediate member 2.

In the illustrated first embodiment of the present disclosure as shown in FIG. 2, the head portion 11 has a width larger than that of the body portion 12, the intermediate member 2 has a width larger than that of the head portion 11, and the object 3 includes an assembling hole 31, which is dimensionally larger than the head portion 11 but smaller than the intermediate member 2. Whereby, when the fastener structure 1 and the intermediate member 2 are in an assembled state, the head portion 11 of the fastener structure 1 is extended through the assembling hole 31 of the object 3 while the intermediate member 2 can only be pressed against the object 3 without extending through the assembling hole 31. At this point, another die 5 can be used to apply a force to the intermediate member 2, so that the intermediate member 2 is pressed against the object 3 and a part of the material of the object 3 is forced to move or flow into the material retaining section 21 of the intermediate member 2, which causes the intermediate member 2 and the object 3 to be connected to one another and allows the present disclosure to meet the requirement for use in actual fastening later.

Figures 4, 5:
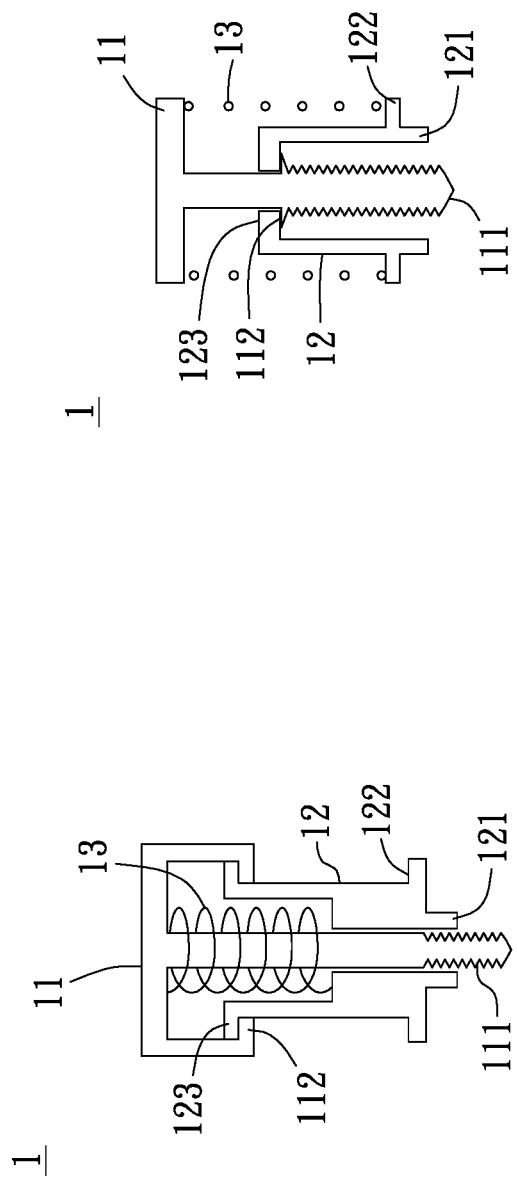
FIG. 4 is an assembled sectional view of a fastener structure according to a second embodiment of the present disclosure.
FIG. 5 is an assembled sectional view of a fastener structure according to a third embodiment of the present disclosure.

According to a preferred embodiment of the present disclosure, the intermediate member 2 and the object 3 are respectively made of a metal material; and the intermediate member 2 has a hardness higher than that of the object 3, so that a part of the material of the object 3 can move or flow into the material retaining section 21 when the intermediate member 2 is forcefully pressed against the object 3, enabling the intermediate member 2 and the object 3 to be connected to one another. Alternatively, in other operable embodiment, the intermediate member 2 may have a hardness lower than that of the object 3 to meet the actual need in connecting them to one another Please refer to FIGS. 4 and 5, which are sectional views of a second and a third embodiment, respectively, of the fastener structure 1 according to the present disclosure. As shown, in both of the second and the third embodiment, in addition to a head portion 11 and a body portion 12, the fastener structure 1 includes an elastic element 13. The head portion 11 includes a fastening section 111 and a mating stop section 112; and the body portion 12 includes a connecting section, a shoulder section 122 and a stop section 123. The elastic element 13 has an end pressed against the head portion 11 and another end pressed against the body portion 12. With the above-described arrangements, when the body portion 12 of the fastener structure 1 has been assembled to an intermediate member and the latter has been further connected to an object (not shown), a force can be applied to the head portion 11, so that the fastening section 111 is connected to a target object while the elastic element 13 is compressed between the heat portion 11 and the body portion 12 to push against the fastening section 111, causing the fastening section 111 to be firmly and stably connected to the target object. On the other hand, it is also possible to apply a force to the head portion 11, so that the fastening section 111 is released from the target object and the elastic element 13 is elastically restored. At this point, the fastening section 111 is pulled by the elastic element 13 to its home position and can be used to fasten to another target object next time. In this manner, at least two objects can be repeatedly and quickly connected to and disconnected from one another using the fastener structure 1 of the present disclosure.

Figure 6:
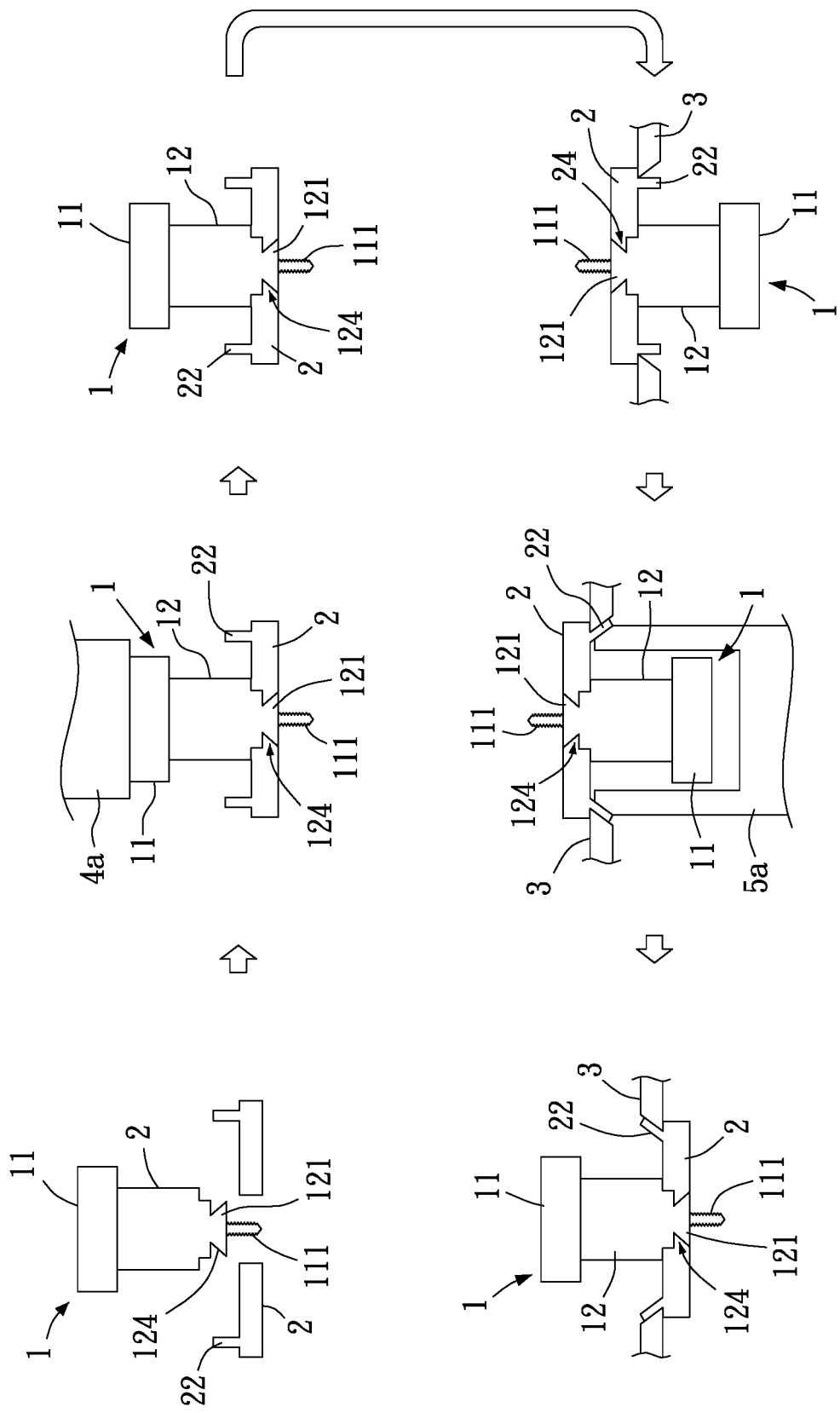
FIG. 6 shows a fastener structure according to a fourth embodiment of the present disclosure and an assembling method thereof.

Please refer to FIG. 6, which shows a fastener structure 1 according to a fourth embodiment of the present disclosure and pictorially describes an assembling method thereof. As shown, the fastener structure 1 in the fourth embodiment includes a head portion 11 having a fastening section 111, and a body portion 12 having a connecting section 121 with a material filling recess 124. The connecting section 121 of the body portion 12 is assembled to an intermediate member 2, which is in turn connected to an object 3. The intermediate member 2 includes a retaining section 22, which is radially outward deformed when an external force is applied thereto, allowing it to be connected to the object 3 through expansion connection.

To assemble the fastener structure 1 in the fourth embodiment, first place the body portion 12 thereof on the intermediate member 2. Then, use a die 4*a* to press against the head portion 11, so that the connecting section 121 of the body portion 12 under the externally applied force is assembled to the intermediate member 2 through expansion connection. As a result, the fastener structure 1 is preliminarily assembled to the intermediate member 2. Thereafter, place the intermediate member 2 on the object 3, and use another die 5*a* to press against the retaining section 22 of the intermediate member 2, such that the retaining section 22 under the external force is deformed, causing the intermediate member 2 to be connected to the object 3 through expansion connection. In the above-described manner, the body portion 12 of the fastener structure 1 can be assembled to the intermediate member 2 and the latter can be then further connected to the object 3, while the fastening section 111 of the fastener structure 1 can be fastened to a target object or released from the target object. Thus, with the fastener structure 1 of the present disclosure, at least two objects can be repeatedly and quickly connected to and disconnected from one another.

In the fourth embodiment, when the head portion 11 is pressed by the die 4*a*, the material filling recess 124 on the connecting section 121 of the body portion 12 is forced against the intermediate member 2, so that partial material of the intermediate member 2 is caused to move or flow into the material filling recess 124, bringing the body portion 12 and the intermediate member 2 to be assembled to one another. In this manner, the body portion 12 of the fastener structure 1 can also be firmly assembled to the intermediate member 2.

While the present disclosure has been described by means of specific embodiments, numerous modifications and variations could be made thereto by those skilled in the art without departing from the scope and spirit of the present disclosure set forth in the claims.

What is claimed is:

1. A fastener structure, comprising:
a head portion; and
a body portion being movably connected to the head portion and including a connecting section for assembling to an intermediate member; the intermediate member including a material retaining section and being adapted to be further connected to an object; and partial material of the object being caused to move or flow into the material retaining section when the intermediate member is forcefully pressed against the object, whereby the object and the intermediate member are connected to one another.

2. The fastener structure according to claim 1, wherein the connecting section is assembled to the intermediate member through expansion connection when an external force is applied to the connecting section.

3. The fastener structure according to claim 1, wherein the head portion includes a mating stop section and the body portion includes a stop section; and the mating stop section and the stop section being pressed against each other when the head portion and the body portion are movably connected together, so that the head portion and the body portion do not separate from each other.

4. The fastener structure according to claim 3, wherein the head portion includes a fastening section.

5. The fastener structure according to claim 4, wherein the fastening section is selected from the group consisting of a cylinder, a screw, a male fastener and a female fastener.

6. The fastener structure according to claim 3, further comprising an elastic element; and the elastic element having an end pressed against the head portion and another end pressed against the body portion.

7. The fastener structure according to claim 1, wherein the head portion has a width larger than that of the body portion, the intermediate member has a width larger than that of the head portion, and the object includes an assembling hole dimensionally larger than the head portion but smaller than the intermediate member.

8. The fastener structure according to claim 1, wherein the intermediate member and the object are respectively made of a metal material; and the intermediate member having a hardness that can be higher or lower than that of the object.

9. The fastener structure according to claim 1, wherein the body portion includes a shoulder section; and the intermediate member being clamped between the connecting section and the shoulder section.

10. A fastener structure assembling method for assembling the fastener structure according to claim 1, comprising the following steps: assembling a connecting section of the fastener structure to an intermediate member; and connecting a material retaining section of the intermediate member to an object by pressing the intermediate member against the object, so that partial material of the object is forced to move or flow into the material retaining section, which makes the intermediate member to be connected to the object.

11. A fastener structure, comprising:
a body portion for movably connected to a head portion; the body portion including a connecting section for assembling to an intermediate member; the intermediate member including a material retaining section and being adapted to be further connected to an object; and partial material of the object being caused to move or flow into the material retaining section when the intermediate member is forcefully pressed against the object, whereby the object and the intermediate member are connected to one another.

12. The fastener structure according to claim 11, wherein the connecting section is assembled to the intermediate member through expansion connection when an external force is applied to the connecting section.

13. The fastener structure according to claim 11, wherein the intermediate member and the object are respectively made of a metal material; and the intermediate member having a hardness that can be higher or lower than that of the object.

14. The fastener structure according to claim 11, wherein the body portion includes a shoulder section; and the intermediate member being clamped between the connecting section and the shoulder section.

15. A fastener structure assembling method for assembling the fastener structure according to claim 11, comprising the following steps: assembling a connecting section of the fastener structure to an intermediate member; and connecting a material retaining section of the intermediate member to an object by pressing the intermediate member against the object, so that partial material of the object is forced to move or flow into the material retaining section, which makes the intermediate member to be connected to the object.

* * * * *